United States Patent
Chen et al.

(10) Patent No.: US 7,394,602 B2
(45) Date of Patent: Jul. 1, 2008

(54) OPTICAL SYSTEM FOR TAKING IMAGE

(75) Inventors: Chun Shan Chen, Taichung (TW); Hsiang Chi Tang, Taichung (TW)

(73) Assignee: Largan Precision Co., Ltd, Taichung (TW)

( * ) Notice: Subject to any disclaimer, the term of this patent is extended or adjusted under 35 U.S.C. 154(b) by 21 days.

(21) Appl. No.: 11/616,013

(22) Filed: Dec. 25, 2006

(65) Prior Publication Data
US 2008/0100926 A1  May 1, 2008

(30) Foreign Application Priority Data
Oct. 30, 2006  (TW) .............................. 95140075 A

(51) Int. Cl.
G02B 9/12  (2006.01)
G02B 3/02  (2006.01)
G02B 9/14  (2006.01)

(52) U.S. Cl. .................... 359/785; 359/716; 359/784

(58) Field of Classification Search ............ 359/716, 359/784, 785
See application file for complete search history.

(56) References Cited
U.S. PATENT DOCUMENTS
2007/0242369 A1* 10/2007  Huang et al. ................. 359/716
* cited by examiner Primary Examiner—David N Spector
(74) Attorney, Agent, or Firm—Banger Shia

(57) ABSTRACT

An optical system for taking image comprises three lens elements with refractive power, from the object side to the image side: a first positive lens element having a convex front surface and a concave rear surface, and the front surface being aspheric; a negative plastic second lens element having a concave front surface and a convex rear surface, and the front and rear surfaces thereof being aspheric; a positive plastic third lens element having a convex front surface and a concave rear surface, the front and rear surfaces thereof being aspheric; and an aperture stop located between the first and second lens elements for controlling brightness of the optical system. The focal length of the first lens element is f1, a focal length of the second lens element is f2, a focal length of the optical system is f, and they satisfy the relations: $f/f1>0.95$, $|f/f2|>0.34$.

23 Claims, 4 Drawing Sheets

OPTICAL SYSTEM FOR TAKING IMAGE

BACKGROUND OF THE INVENTION

1. Field of the Invention

The present invention relates to an optical system, and more particularly to a miniaturized optical system for taking image used in a camera mobile phone.

2. Description of the Prior Art

In recent years, with the popularity of camera mobile phone, the optical system for taking image has been becoming thinner and thinner, and the photosensitive assembly of a general digital camera is nothing more than CCD (Charge Coupled Device) or CMOS (Complementary Metal Oxide Semiconductor). Due to the advancement of the semiconductor technique, the pixel size of photosensitive assembly has been being reduced continuously, and the development of the miniaturized optical system for taking image is toward the high resolution field. Therefore, the demand for the image quality is increasing gradually.

A conventional mobile phone's lens assembly usually consists of three lenses: from the object side to the image side: a first lens element with positive refractive power, a second lens element with negative refractive power and a third lens element with positive refractive power, thus forming the so-called type of Triplet. To correct the aberration, the optical system usually takes the form of "front aperture stop". However, the arrangement of front aperture stop will increase the occurrence of stray light and the sensitivity of the optical system.

The present invention has arisen to mitigate and/or obviate the afore-described disadvantages.

SUMMARY OF THE INVENTION

The primary objective of the present invention is to improve the image quality and effectively reduce the sensitivity of the optical system, the present invention provides a whole new three-lens type optical system.

An optical system for taking image in accordance with the present invention comprises three lens elements with refractive power, from the object side to the image side:

a first lens element with positive refractive power having a convex front surface and a concave rear surface, the front surface of the first lens being aspheric;

a plastic second lens element with negative refractive power having a concave front surface and a convex rear surface, the front surface and the rear surface of the second lens being aspheric; and a plastic third lens element with positive refractive power having a convex front surface and a concave rear surface, the front surface and the rear surface of the third lens being aspheric;

wherein an aperture stop of the optical system is located between the first lens element and the second lens element for controlling brightness of the optical system.

In the optical system for taking image, the refractive power of the optical system for taking image of the present invention is mainly provided by the first lens element with positive refractive power, the second lens element with negative refractive power is generally used to correct the chromatic aberration, and the third lens element serves to balance and correct the various aberrations caused by the system.

In the optical system for taking image, the front surface and the rear surface of the first lens element with positive refractive power are convex and concave, respectively. The front surface and the rear surface of the second lens element with negative refractive power are concave and convex, respectively. And the front surface and the rear surface of the third lens element with positive refractive power are convex and concave, respectively. By such arrangements, the image quality can be improved effectively.

The first lens element provides a strong positive refractive power, and the aperture stop is located close to the object side, so that the exit pupil of the optical lens assembly will be far away from the image plane. Therefore, the light will be projected onto the photosensitive assembly with a relatively small incident angle, this is the telecentric feature of the image side, and this feature is very important to the photosensitive power of the current solid photosensitive assembly, and can improve the photosensitivity of the photosensitive assembly while reducing the probability of the occurrence of shading. And at least one inflection point is formed on the aspheric surface of the third lens element to contribute to a better correction of the incident angle of the off axis light with respect to the photosensitive assembly. In addition, for a wide-angle optical system, it particularly needs to correct the distortion and the chromatic aberration of magnification, the correction method is to arrange the aperture stop at the balance point of the refractive power of the optical system. And the aperture stop of the optical system of the present invention is located between the first lens element and the second lens element, the purpose of such an arrangement is to balance the telecentric and wide field of view. Further, the position of the aperture stop can effectively reduce the refraction angle of the light with respect to the lens element, thus reducing the sensitivity of the optical system.

With the trend of miniaturization of the optical lens assembly and the requirement of increasing the field of view, the focal length of the optical system is becoming shorter. Therefore, the radius of curvature and the size of the lens elements must be reduced, and it is impossible to make such glass lenses by the use of the conventional grind method. Plastic material is introduced to make lenses by injection molding, using a relatively low cost to produce high precision lenses. The surface of lens is aspheric for obtaining much more controlled variables, so as to reduce the aberration and the number of the lenses, so that the length of the optical system can be reduced effectively.

In the optical system for taking image, an Abbe number of the second lens element is V2, and it satisfies the relation:

$V2<40$

The abovementioned relation can effectively correct the chromatic aberration caused by the system, and improve the resolution of the optical system for taking image.

And it will be better if the Abbe number V2 of the second lens element satisfies the relation:

$V2<28$

Further, it will be much better if the Abbe number V2 of the second lens element satisfies the relation:

$V2<25$

In the optical system for taking image, the Abbe number of the first lens element is V1, the Abbe number of the third lens element is V3, and they satisfy the relations:

$V1>50$ $V3>50$

The abovementioned relation can effectively correct the chromatic aberration caused by the system. And it will be better if the Abbe number V1 of the first lens element satisfies the relation:

$$V1 > 58$$

In the optical system for taking image, the refractive index of the second lens element is N2, and it satisfies the relation:

$$N2 < 1.65$$

If the refractive index of the second lens element is higher than the high limit as stated above, it will be difficult to find an appropriate plastic optical material to match the optical system.

In the optical system for taking image, the focal length of the first lens element is f1, the focal length of the optical system is f, and they satisfies the relation:

$$f/f1 > 0.95$$

The abovementioned relation can provide enough refractive power for the optical system and can reduce the total length of the optical system. Further, it will be better if f/f1 satisfies the relation:

$$f/f1 > 1.2$$

And it will be much better if f/f1 satisfies the relation:

$$f/f1 > 1.25$$

In the optical system for taking image, the focal length of the second lens element is f2, the focal length of the optical system is f, and they satisfies the relation:

$$|f/f2| > 0.34$$

$$|f/f2| < 0.9$$

If the value of |f/f2| is smaller than the abovementioned low limit, it will be difficult to correct the chromatic aberration caused by the optical system, and if the value of |f/f2| is greater than the abovementioned high limit, the length of the optical system for taking image will be too long, and this will be counter to the objective of miniaturization of the optical system for taking image.

In the optical system for taking image, the focal length of the third lens element is f3, the focal length of the optical system is f, and they satisfy the relation:

$$f/f3 < 0.25$$

The third lens element serves as a correcting lens to balance and correct the various aberrations caused by the optical system. If the value of f/f3 is greater than the abovementioned high limit, the back focal length of the optical system will be too short.

In the optical system for taking image, the radius of curvature of the front surface of the first lens element is R1, the radius of curvature of the rear surface of the first lens element is R2, and they satisfy the relation:

$$0 < R1/R2 < 0.5$$

If the value of R1/R2 is lower than the low limit as stated above, it will be difficult to correct the Astigmatism caused by the optical system for taking image. On the other hand, if the value of R1/R2 is higher than the abovementioned high limit, it will be difficult to correct the spherical aberration caused by the optical system. And it will better if the value of R1/R2 satisfies the relation:

$$0.1 < R1/R2 < 0.2$$

In the optical system for taking image, the tangential angle at the position of the effective diameter of a rear surface of the third lens element is ANG32, and it satisfies the relation:

$$ANG32 \leftarrow 30 \text{ deg.}$$

The tangential angle at the position of the effective diameter of the surface is defined as: The angle between the line perpendicular to the optical axis and the tangential line at the position the surface. When the tangential angle at the position of the effective diameter of the surface is inclined toward the image side, the tangential angle is positive, and when the tangential angle at the position of the effective diameter of the surface is inclined toward the object side, the tangential angle is negative.

In the optical system for taking image, the height at the position of the effective diameter of the rear surface of the third lens element is SAG32, and it satisfies the relation:

$$SAG32 \leftarrow 0.2 \text{ mm}$$

The height at the position of the effective diameter of the surface is defined as: the distance between the position at the effective diameter and the position at the optical axis, which projects onto the optical axis. When the height at the position of the effective diameter of the surface is inclined toward the image side, the height is positive, and when the height at the position of the effective diameter of the surface is inclined toward the object side, the height is negative. The abovementioned relations can effectively reduce the incident angle of the light with respect to the photosensitive assembly while improving the correction of the off axis aberration.

In the optical system for taking image, the center thickness of the second lens element is CT, the edge thickness of the first lens element is ET1, they satisfy the relations:

$$CT2 < 0.4 \text{ mm}$$

$$ET1 < 0.4 \text{ mm}$$

The edge thickness is: the length projected on an optical axis by the distance between the positions of the effective diameter of the front and the rear surfaces of the lens. The abovementioned relations can reduce the height of the optical system while improving the image quality.

In the optical system for taking image, the distance between the second lens element and the third lens element is T23, and it satisfies the relation:

$$T23 > 0.2 \text{ mm}$$

The abovementioned relation can effectively improve the correction of the off axis aberration, and it will be better if T23 satisfies the relation:

$$T23 > 0.38 \text{ mm}$$

In the optical system for taking image, at least one inflection point is formed on the rear surface of the first lens element, so as to effectively improve the image quality.

In the optical system for taking image, an object to be photographed is imaged on an electronic photosensitive assembly, a length of the optical system is TL, an image height of the optical system is ImgH, and they satisfy the relation:

$$TL/ImgH < 2.05$$

The abovementioned relation contributes to the miniaturization of the optical system for taking image.

DETAILED DESCRIPTION OF THE PREFERRED EMBODIMENTS

Figure 1:
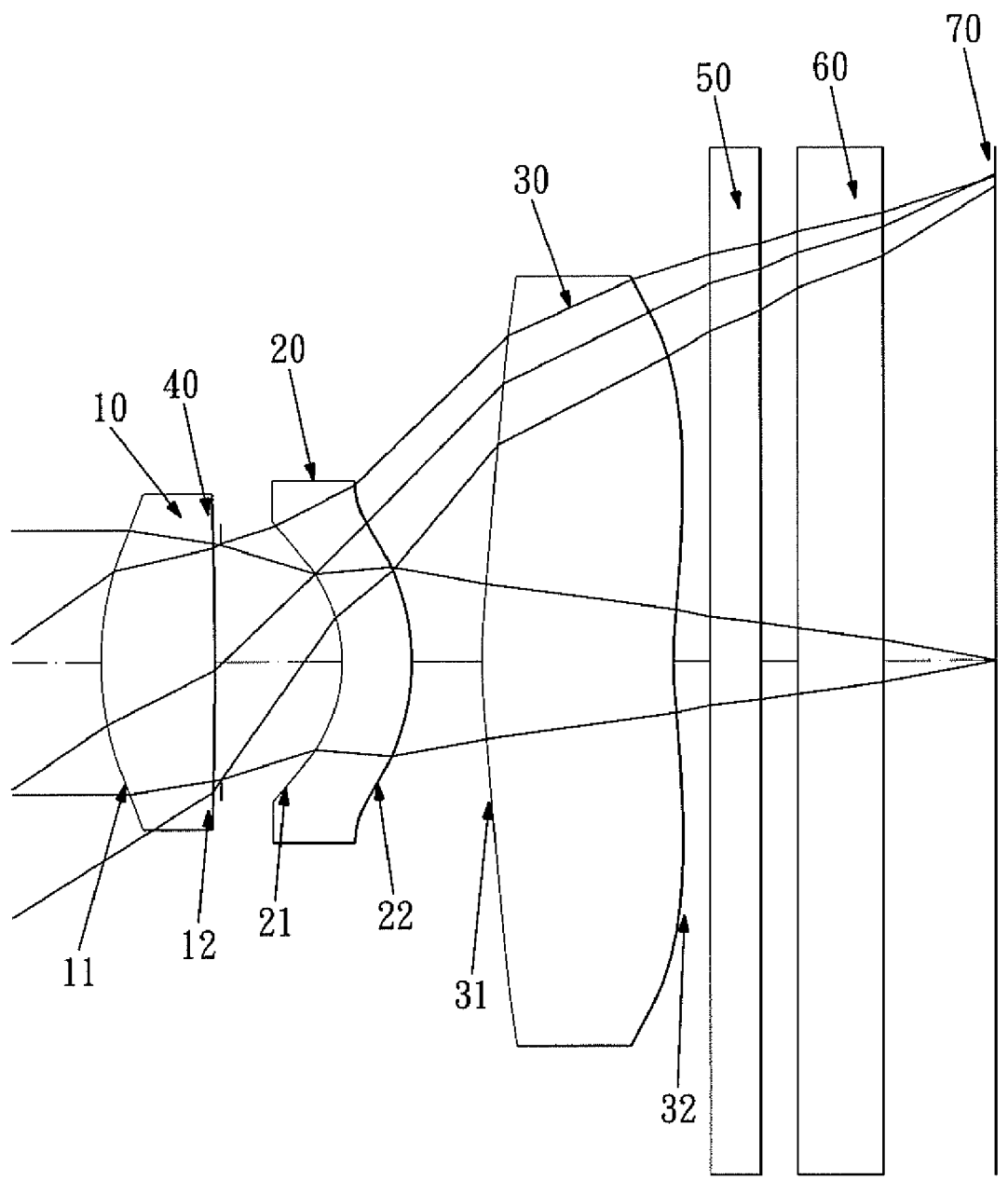
FIG. 1 shows an optical system for taking image in accordance with a first embodiment of the present invention.
Figure 2:
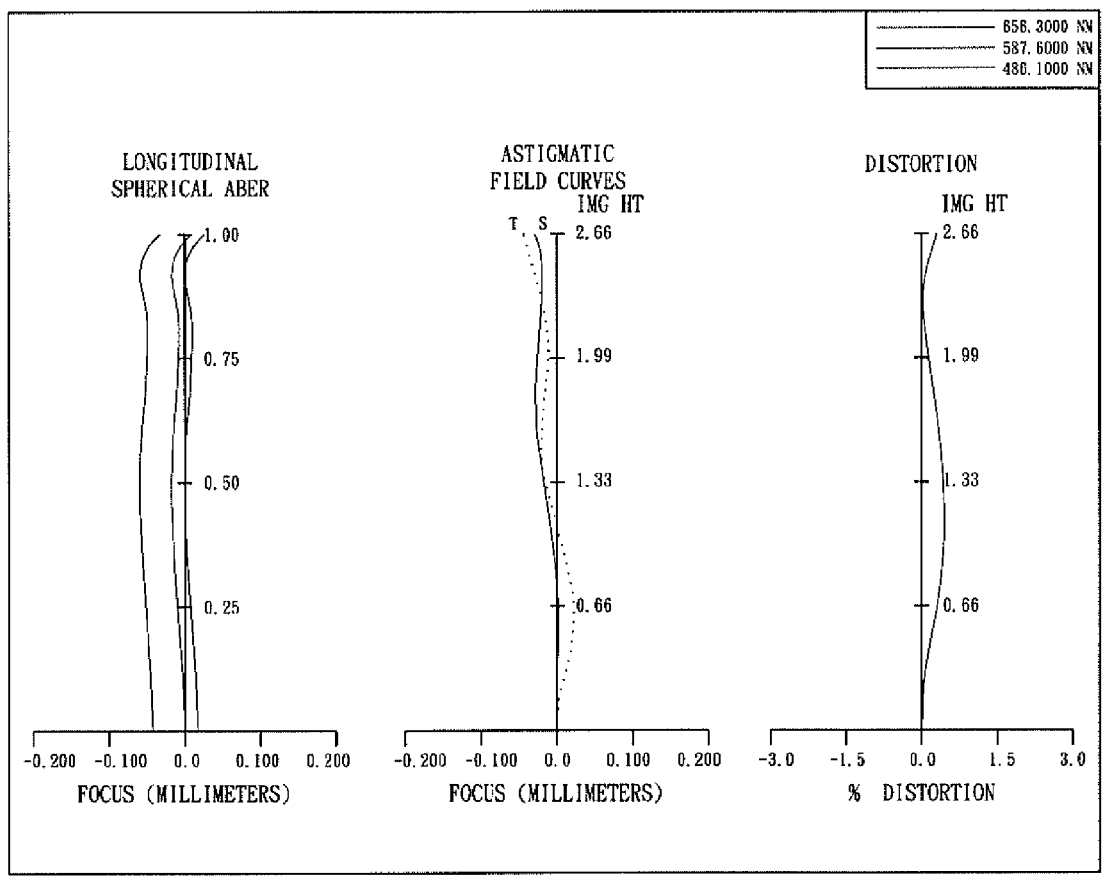
FIG. 2 shows the aberration curve of the first embodiment the present invention.

Referring to FIG. 1, which shows an optical system for taking image in accordance with a first embodiment of the present invention, and FIG. 2 shows the aberration curve of the first embodiment of the present invention. The first embodiment of the present invention is an optical system for taking image comprising three lens elements with refractive power, and the optical system for taking image comprises: from the object side to the image side:

A plastic first lens element 10 with positive refractive power has a convex front surface 11 and a concave rear surface 12, the front surface 11 and the rear surface 12 of the first lens element are aspheric, and an inflection point is formed on the rear surface 12.

A plastic second lens element 20 with negative refractive power has a concave front surface 21 and a convex rear surface 22, and the front surface 21 and the rear surface 22 of the second lens element are aspheric.

A plastic third lens element 30 with positive refractive power has a convex front surface 31 and a concave rear surface 32, the front surface 31 and the rear surface 32 of the third lens element are aspheric, and the third lens element 30 is formed with an inflection point.

An aperture stop 40 is located between the first lens element 10 and the second lens element 20 for controlling brightness of the optical system.

An IR cut filter 50 is located behind the third lens element 30 and has no influence on the focal length of the optical system.

A sensor cover glass 60 is located behind the IR cut filter 50 and has no influence on the focal length of the optical system.

An image plane 70 is located behind the sensor cover glass 60.

The equation of the curve of the aspheric surfaces is expressed as follows:

$$X(Y)=(Y^2/R)/(1+sqrt(1-(1+k)*(Y/R)^2))+A_4*Y^4+A_6*Y^6+\ldots$$

wherein:

X: represents the distance of the cross section of the lens;

Y: the height from the point on the curve of the aspheric surface to the optical axis;

K: represents the conical coefficients;

A4, A6 . . . : the aspheric surface coefficients of the fourth and sixth order.

In the optical system for taking image of the first embodiment, the Abbe number of the first lens element is V1, the Abbe number of the second lens element is V2, and the Abbe number of the third lens element is V3, wherein V1=60.3, V2=26.6, V3=55.8.

In the optical system for taking image of the first embodiment, the refractive index of the second lens element is N2, and N2=1.606.

In the optical system for taking image of the first embodiment, the focal length of the first lens element is f1, the focal length of the second lens element is f2, the focal length of the third lens element is f3, the focal length of the optical system for taking image is f, and they satisfy the relations: f/f1=1.26, |f/f2|=0.36, f/f3=0.15

In the optical system for taking image of the first embodiment, the radius of curvature of the front surface of the first lens element is R1, and the radius of curvature of the rear surface of the first lens element is R2, they satisfy the relation: R1/R2=0.13.

In the optical system for taking image of the first embodiment, the tangential angle at the position of the effective diameter of a rear surface of the third lens element is ANG32, and ANG32=−34.1 deg.

The tangential angle at the position of the effective diameter of the surface is defined as: The angle between the line perpendicular to the optical axis and the tangential line at the position the surface. When the tangential angle at the position of the effective diameter of the surface is inclined toward the image side, the tangential angle is positive, and when the tangential angle at the position of the effective diameter of the surface is inclined toward the object side, the tangential angle is negative.

In the optical system for taking image of the first embodiment, the height at the position of the effective diameter of the rear surface of the third lens element is SAG32, and SAG32=−0.25 mm.

The height at the position of the effective diameter of the surface is defined as: the distance between the position at the effective diameter and the position at the optical axis, which projects onto the optical axis. When the height at the position of the effective diameter of the surface is inclined toward the image side, the height is positive, and when the height at the position of the effective diameter of the surface is inclined toward the object side, the height is negative.

In the optical system for taking image of the first embodiment, the edge thickness of the first lens element is ET1, the center thickness of the second lens element is CT2, the distance between the second lens element and the third lens element is T23, and they satisfy the relations: ET1=0.400 mm, CT2=0.400 mm, T23=0.403 mm.

The edge thickness is: the length projected on an optical axis by the distance between the positions of the effective diameter of the front and the rear surfaces of the lens.

In the optical system for taking image of the first embodiment, the length of the optical system is TL, the image height of the optical system is ImgH, and they satisfy the relation: TL/ImgH=1.94.

The data of the structure of the first embodiment is shown in table 1, and the aspheric surface data is shown in table 2, wherein the units of the radius of curvature, the thickness and the focal length are expressed in mm, and HFOV is half of the maximal field of view.

TABLE 1

(Embodiment 1)
f(focal length) = 4.05 mm, Fno = 2.8,
HFOV (half of field of view) = 33.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.55698 (ASP) | 0.655 | Plastic | 1.543 | 60.3 | 3.22 |
| 2 | | 11.75710 (ASP) | 0.047 | | | | |
| 3 | Ape. Stop | Plano | 0.698 | | | | |

TABLE 1-continued (Embodiment 1)
f(focal length) = 4.05 mm, Fno = 2.8,
HFOV (half of field of view) = 33.0 deg.

| Surface # | | Curvature Radius | Thickness | Material | Index | Abbe # | Focal length |
|---|---|---|---|---|---|---|---|
| 4 | Lens 2 | −0.73359 (ASP) | 0.400 | Plastic | 1.606 | 26.6 | −11.45 |
| 5 | | −0.98900 (ASP) | 0.403 | | | | |
| 6 | Lens 3 | 3.98390 (ASP) | 1.101 | Plastic | 1.53 | 55.8 | 27.45 |
| 7 | | 4.95130 (ASP) | 0.200 | | | | |
| 8 | IR-filter | Plano | 0.300 | Glass | 1.517 | 64.1 | — |
| 9 | | Plano | 0.200 | | | | |
| 10 | Cover Glass | Plano | 0.500 | Glass | 1.517 | 64.1 | — |
| 11 | | Plano | 0.626 | | | | |
| 12 | Image | Plano | | | | | |

TABLE 2

Aspheric Coefficient

| Surface # | 1 | 2 | 4 | 5 | 6 | 7 |
|---|---|---|---|---|---|---|
| K = | 1.37587E−01 | 9.62422E+01 | −3.07134E+00 | −6.13897E−01 | −3.52240E+01 | −2.74654E+01 |
| A4 = | −7.56636E−03 | −7.5168E−02 | −7.06220E−01 | 6.38934E−02 | −1.95150E−02 | −3.90432E−02 |
| A6 = | −7.19498E−02 | −1.03333E−01 | 7.46874E−01 | −4.54511E−02 | 5.34151E−03 | 6.39075E−03 |
| A8 = | 1.16863E−01 | 3.02141E−01 | 2.97293E−01 | 4.36847E−01 | −3.81336E−04 | −1.43844E−03 |
| A10 = | −1.88319E−01 | −1.11220E+00 | −8.00480E−01 | −1.57047E−01 | — | 1.61965E−04 |
| A12 = | 4.00264E−02 | 1.10968E+00 | 9.33745E−02 | −8.73112E−02 | — | −4.80071E−06 |
| A14 = | — | — | −1.20299E−02 | 3.35883E−02 | — | — |

Figure 3:
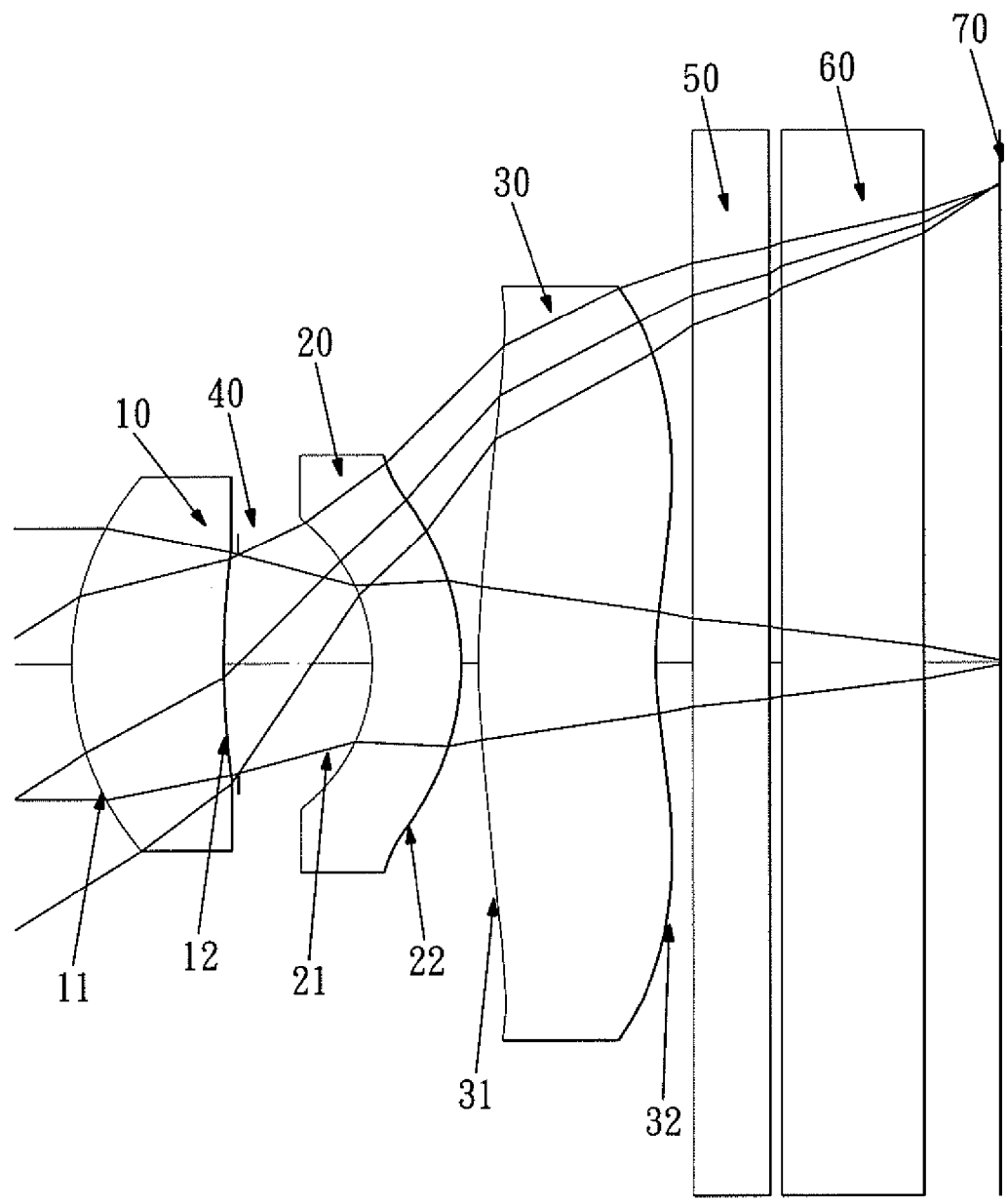
FIG. 3 shows an optical system for taking image in accordance with a second embodiment of the present invention.
Figure 4:
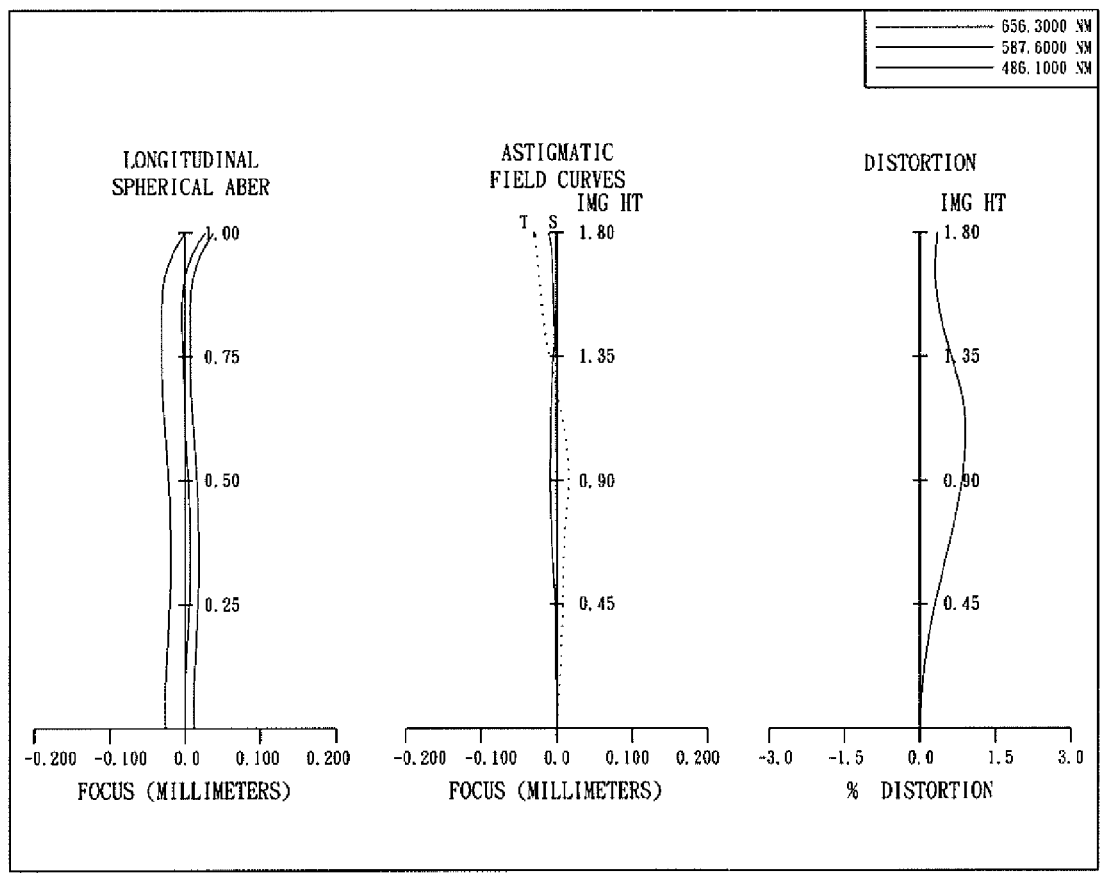
FIG. 4 shows the aberration curve of the second embodiment the present invention.

Referring to FIG. 3, which shows an optical system for taking image in accordance with a second embodiment of the present invention, and FIG. 4 shows the aberration curve of the second embodiment of the present invention. The second embodiment of the present invention is an optical system for taking image comprising three lens elements with refractive power, and the optical system for taking image comprises: from the object side to the image side:

A plastic first lens element 10 with positive refractive power has a convex front surface 11 and a concave rear surface 12, and the front surface 11 and the rear surface 12 of the first lens element are aspheric.

A plastic second lens element 20 with negative refractive power has a concave front surface 21 and a convex rear surface 22, and the front surface 21 and the rear surface 22 of the second lens element are aspheric.

A plastic third lens element 30 with positive refractive power has a convex front surface 31 and a concave rear surface 32, the front surface 31 and the rear surface 32 of the third lens element are aspheric, and the third lens element 30 is formed with an inflection point.

An aperture stop 40 is located between the first lens element 10 and the second lens element 20 for controlling brightness of the optical system.

An IR cut filter 50 is located behind the third lens element 30 and has no influence on the focal length of the optical system.

A sensor cover glass 60 is located behind the IR cut filter 50 and has no influence on the focal length of the optical system.

An image plane 70 is located behind the sensor cover glass 60.

The equation of the curve of the aspheric surfaces of the second embodiment is the same as that of the first embodiment.

In the optical system for taking image of the second embodiment, the Abbe number of the first lens element is V1, the Abbe number of the second lens element is V2, the Abbe number of the third lens element is V3, and V1=60.3, V2=23.4, V3=55.8.

In the optical system for taking image of the second embodiment, the refractive index of the second lens element is N2, and N2=1.632.

In the optical system for taking image of the second embodiment, the focal length of the first lens element is f1, the focal length of the second lens element is f2, the focal length of the third lens element is f3, the focal length of the optical system for taking image is f, and they satisfy the relations: f/f1=1.22, |f/f2|=0.44, f/f3=0.24.

In the optical system for taking image of the second embodiment, the radius of curvature of the front surface of the first lens element is R1, and the radius of curvature of the rear surface of the first lens element is R2, they satisfy the relation: R1/R2=0.27.

In the optical system for taking image of the second embodiment, the tangential angle at the position of the effective diameter of a rear surface of the third lens element is ANG32, and ANG32=−39.6 deg.

The definition of the tangential angle ANG32 of the second embodiment is the same as that of the first embodiment.

In the optical system for taking image of the second embodiment, the height at the position of the effective diameter of the rear surface of the third lens element is SAG32, and SAG32=−0.14 mm.

The definition of the height SAG32 of the second embodiment is the same as that of the first embodiment.

In the optical system for taking image of the second embodiment, the edge thickness of the first lens element is ET1, the center thickness of the second lens element is CT2, the distance between the second lens element and the third lens element is T23, and ET1=0.359 mm, CT2=0.350 mm, T23=0.070 mm.

The definition of the edge thickness of the second embodiment is the same as that of the first embodiment.

In the optical system for taking image of the second embodiment, the length of the optical system is TL, the image height of the optical system is Imgh, and they satisfy the relation: TL/ImgH=2.03.

The data of the structure of the second embodiment is shown in table 3, and the aspheric surface data is shown in table 4, wherein the units of the radius of curvature, the thickness and the focal length are expressed in mm, and HFOV is half of the maximal field of view.

TABLE 3

(Embodiment 2)
f(focal length) = 2.89 mm, Fno = 2.8,
HFOV (half of field of view) = 31.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.01836 ASP | 0.602 | Plastic | 1.543 | 60.3 | 2.36 |
| 2 | | 3.82400 (ASP) | 0.053 | | | | |
| 3 | Ape. Stop | Infinity | 0.528 | | | | |
| 4 | Lens 2 | −0.62407 (ASP) | 0.350 | Plastic | 1.632 | 23.4 | −6.56 |
| 5 | | −0.89356 (ASP) | 0.070 | | | | |
| 6 | Lens 3 | 2.02762 (ASP) | 0.697 | Plastic | 1.53 | 55.8 | 12.16 |
| 7 | | 2.59896 (ASP) | 0.150 | | | | |
| 8 | IR-filter | Plano | 0.300 | Glass | 1.517 | 64.1 | — |
| 9 | | Plano | 0.050 | | | | |
| 10 | Cover Glass | Plano | 0.550 | Glass | 1.517 | 64.1 | — |
| 11 | | Plano | 0.301 | | | | |
| 12 | Image | Plano | | | | | |

TABLE 4

Aspheric Coefficient

| Surface # | 1 | 2 | 4 | 5 | 6 | 7 |
|---|---|---|---|---|---|---|
| K = | −4.48235E−01 | −3.31506E+01 | −1.12702E+00 | −1.81125E−01 | −2.90359E+01 | −6.90682E+00 |
| A4 = | 3.65670E−02 | 5.12100E−02 | −1.36123E−01 | −8.93404E−02 | −1.24396E−01 | −1.68098E−01 |
| A6 = | 9.28051E−02 | −6.00915E−01 | −2.91997E+00 | 5.88791E−01 | 1.34962E−01 | 6.08137E−02 |
| A8 = | −1.73164E−01 | 1.02124E+00 | 1.79892E+01 | 1.64984E−01 | −7.56360E−02 | −2.35830E−02 |
| A10 = | — | — | −6.29711E+01 | — | 2.09185E−02 | 6.08246E−03 |
| A12 = | — | — | 6.53559E+01 | — | −2.34988E−03 | −1.07127E−03 |

TABLE 5

| | Embodiment 1 | Embodiment 2 |
|---|---|---|
| f | 4.05 | 2.89 |
| Fno | 2.8 | 2.8 |
| HFOV | 33.0 | 31.7 |
| V1 | 60.3 | 60.3 |
| V2 | 26.6 | 23.4 |
| V3 | 55.8 | 55.8 |
| N2 | 1.606 | 1.632 |
| f/f1 | 1.26 | 1.22 |
| |f/f2| | 0.36 | 0.44 |
| f/f3 | 0.15 | 0.24 |
| R1/R2 | 0.13 | 0.27 |
| ANG32 | −34.1 | −39.6 |
| SAG32 | −0.25 | −0.14 |
| CT2 | 0.400 | 0.350 |
| ET1 | 0.400 | 0.359 |
| T23 | 0.403 | 0.070 |
| TL/ImgH | 1.94 | 2.03 |

It is to be noted that the tables 1-4 show different data of the different embodiments, however, the data of the different embodiments is obtained from experiments. Therefore, any product of the same structure is contemplated to be within the scope of the present invention even if it uses different data. Table 5 is the data of the respective embodiments resulted from the equations.

While we have shown and described various embodiments in accordance with the present invention, it is clear to those skilled in the art that further embodiments may be made without departing from the scope of the present invention.

What is claimed is:

1. An optical system for taking image comprising three lens elements with refractive power, from the object side to the image side:

a first lens element with positive refractive power having a convex front surface and a concave rear surface, the front surface of the first lens being aspheric;

a plastic second lens element with negative refractive power having a concave front surface and a convex rear surface, the front surface and the rear surface of the second lens being aspheric;

a plastic third lens element with positive refractive power having a convex front surface and a concave rear surface, the front surface and the rear surface of the third lens being aspheric; and an aperture stop located between the first lens element and the second lens element for controlling brightness of the optical system;

wherein a focal length of the first lens element is f1, a focal length of the second lens element is f2, a focal length of the optical system is f, and they satisfy the relations: $f/f1 > 0.95$, $|f/f2| > 0.34$.

2. The optical system for taking image as claimed in claim 1, wherein the first lens element is made of plastic material, the rear surface of the first lens element is aspheric, and the third lens element is formed with at least one inflection point.

3. The optical system for taking image as claimed in claim 2, wherein an Abbe number of the second lens element is V2, and it satisfies the relation: $V2 < 40$.

4. The optical system for taking image as claimed in claim 3, wherein an Abbe number of the second lens element is V2, and it satisfies the relation: $V2 < 28$.

5. The optical system for taking image as claimed in claim 4, wherein an Abbe number of the second lens element is V2, and it satisfies the relation: $V2 < 25$.

6. The optical system for taking image as claimed in claim 5, wherein a refractive index of the second lens element is N2, and it satisfies the relation: $N2 < 1.65$.

7. The optical system for taking image as claimed in claim 4, wherein a radius of curvature of the front surface of the first lens element is R1, and a radius of curvature of the rear surface of the first lens element is R2, they satisfy the relation: $0 < R1/R2 < 0.5$.

8. The optical system for taking image as claimed in claim 7, wherein a radius of curvature of the front surface of the first lens element is R1, and a radius of curvature of the rear surface of the first lens element is R2, they satisfy the relation: 0<R1/R2<0.2.

9. The optical system for taking image as claimed in claim 4, wherein a tangential angle ANG32 at a position of an effective diameter of a rear surface of the third lens element satisfies the relation: ANG32←−30 deg.

10. The optical system for taking image as claimed in claim 9, wherein a height SAG32 at the position of the effective diameter of a rear surface of the third lens element satisfies the relation: SAG32←−0.2 mm.

11. The optical system for taking image as claimed in claim 4, wherein a center thickness of the second lens element is CT2, and it satisfies the relation: CT2<0.4 mm.

12. The optical system for taking image as claimed in claim 11, wherein an edge thickness of the first lens element is ET1, and it satisfies the relation: ET1<0.4 mm.

13. The optical system for taking image as claimed in claim 12, wherein a distance between the second lens element and the third lens element is T23, and it satisfies the relation: T23>0.2 mm.

14. The optical system for taking image as claimed in claim 13, wherein a distance between the second lens element and the third lens element is T23, and it satisfies the relation: T23>0.38 mm.

15. The optical system for taking image as claimed in claim 2, wherein the focal length of the first lens element is f1, the focal length of the optical system is f, and they satisfy the relation: f/f1>1.2.

16. The optical system for taking image as claimed in claim 15, wherein the focal length of the first lens element is f1, the focal length of the optical system is f, and they satisfy the relation: f/f1>1.25.

17. The optical system for taking image as claimed in claim 16, wherein an Abbe number of the second lens element is V2, and it satisfies the relation: V2<28.

18. The optical system for taking image as claimed in claim 7, wherein a focal length of the second lens element is f2, a focal length of the optical system is f, and they satisfy the relation: |f/f2|<0.9.

19. The optical system for taking image as claimed in claim 7, wherein a focal length of the third lens element is f3, a focal length of the optical system is f, and they satisfy the relation: |f/f3|<0.25.

20. The optical system for taking image as claimed in claim 7, wherein an Abbe number of the first lens element is V1, an Abbe number of the third lens element is V3, and they satisfy the relations: V1>50, V3>50.

21. The optical system for taking image as claimed in claim 20, wherein the Abbe number of the first lens element is V1, and it satisfies the relation: V1>58.

22. The optical system for taking image as claimed in claim 7, wherein at least one inflection point is formed on the rear surface of the first lens element.

23. The optical system for taking image as claimed in claim 4, wherein an object to be photographed is imaged on an electronic photosensitive assembly, a length of the optical system is TL, an image height of the optical system is ImgH, and they satisfy the relation: TL/ImgH<2.05.

* * * * *